Dec. 19, 1944. A. B. WHITE ET AL 2,365,612
WELDING SYSTEM
Filed March 21, 1942
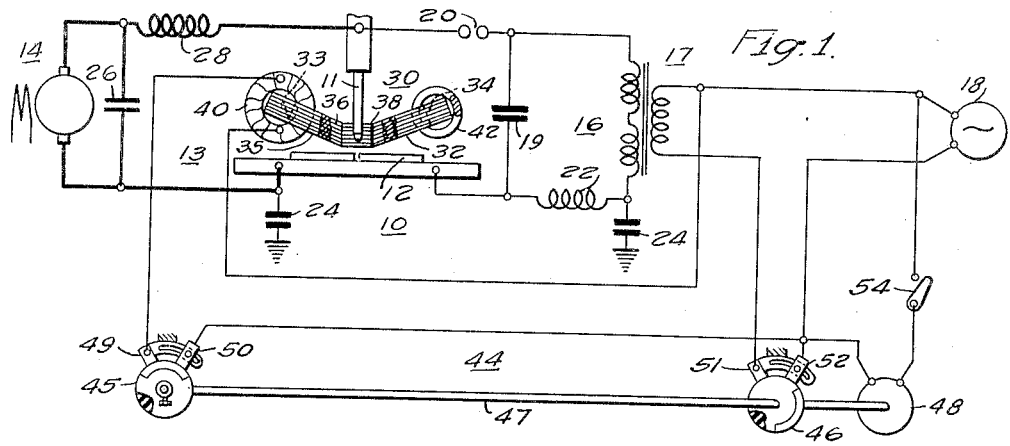
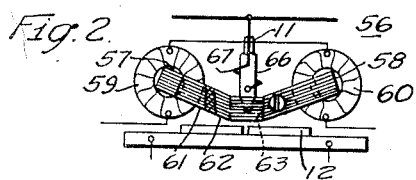
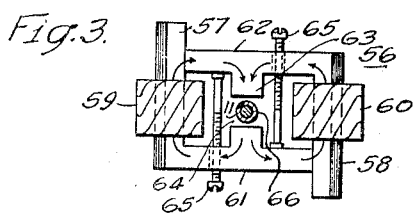
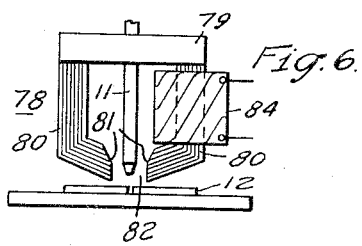
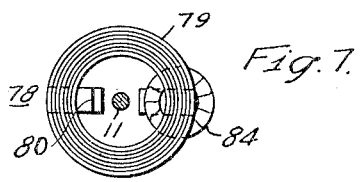
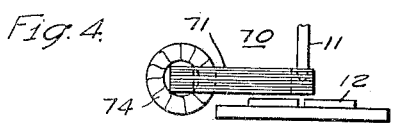
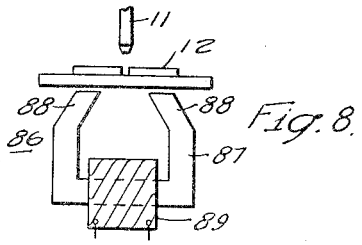
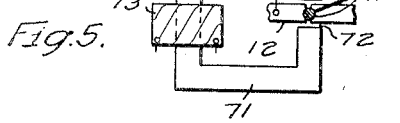
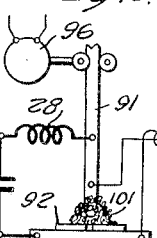
WITNESSES:
E. A. McCloskey
F. V. Giolma
INVENTORS
Albert B. White and
Charles H. Jennings.
BY
Crawford
ATTORNEY Patented Dec. 19, 1944

2,365,612

UNITED STATES PATENT OFFICE 2,365,612

WELDING SYSTEM

Alfred B. White, Murrysville, and Charles H. Jennings, Forest Hills, Pa., assignors to Westinghouse Electric & Manufacturing Company, East Pittsburgh, Pa., a corporation of Pennsylvania Application March 21, 1942, Serial No. 435,608

10 Claims. (Cl. 315—176)

Our invention relates, generally, to welding and it has reference, in particular, to arc welding systems.

Generally stated, one object of our invention is to provide a simple and effective arc welding system which is inexpensive and easily operated.

It is also an object of our invention to provide for both initiating and/or terminating the arc between a spaced electrode and workpiece without requiring relative movement therebetween.

More specifically, it is an object of our invention to provide for initiating an arc between a spaced electrode and a workpiece to permit current to flow therebetween from a relatively low voltage source of welding current, and for terminating the arc by means of a magnetic field when the welding operation is completed, without requiring movement of the electrode toward or away from the workpiece.

Another object of our invention is to provide an automatic arc welding system wherein an arc is initiated between a workpiece upon which a welding operation is to be performed and an arc electrode positioned in spaced relation thereto, and is terminated by magnetic means at a predetermined time after initiation.

It is an object of our invention to provide for using energy storage means for sustaining an arc initiated by a relatively high frequency auxiliary circuit, so as to permit the flow of current from a relatively low voltage source to reach a value sufficient to maintain the arc.

Yet another object of our invention is to provide for terminating an arc welding operation by extinguishing the arc through the use of a controlled magnetic field.

Still another object of our invention is to provide for initiating and terminating an arc welding operation without requiring movement of the welding electrode towards or away from the workpiece upon which the welding operation is performed.

A still further object of our invention is to insure rapid striking of a power arc from a relatively low voltage source in response to a relatively high voltage, high frequency initiating arc, by utilizing energy storage means in connection with the power source to commence the power arc.

It is also an object of our invention to provide for terminating an arc welding operation by extinguishing the arc without requiring the use of contactors, switches, or the like, and without requiring movement of the welding electrode relative to the workpiece upon which the welding operation is being performed.

Other objects will in part be obvious, and will in part appear hereinafter.

In accordance with one embodiment of our invention a relatively high frequency, high voltage source is associated with a welding circuit which is connected to a relatively low voltage source of welding current, to commence a welding operation by initiating an arc between a spaced electrode and a workpiece in the welding circuit. An energy storing condenser may be connected between the workpiece and the electrode to provide a substantially instantaneous source of electrical energy for starting and sustaining a power arc in response to an initiating arc produced by the relatively high voltage, high frequency initiating source, and to sustain the power arc until the current from the low voltage source rises to a sufficient value to maintain the power arc. Termination of a welding operation is effected by an electromagnetic field produced substantially at right angles to the path of the arc current by means of an electromagnet positioned adjacent the arc. Energization of the relatively high frequency initiating circuit and the arc extinguishing electromagnet may be controlled by switch means in timed relation so as to determine the duration of the welding period.

For a more complete understanding of the nature and scope of our invention reference may be had to the accompanying detailed description which may be read in connection with the accompanying drawing in which:

Figure 1 is a diagrammatic view of a welding system embodying the principal features of the invention;

Fig. 2 is a side elevational view of a modified form of arc extinguisher;

Fig. 3 is a plan view of the arc extinguisher shown in Fig. 2;

Fig. 4 is a side elevational view of a further modification of arc extinguisher;

Fig. 5 is a plan view of the arc extinguisher shown in Fig. 4;

Fig. 6 is a side elevational view of another form of arc extinguisher;

Fig. 7 is a plan view of the arc extinguisher shown in Fig. 6;

Fig. 8 illustrates a still further modification of the arc extinguisher; and

Fig. 9 is a diagrammatic view of a welding system illustrating an application of the invention to a relatively deep flux arc welding process.

Referring to Figure 1, the reference numeral 10 may denote, generally, an arc welding system wherein an arcing electrode 11, which may be of any suitable type, is positioned in spaced relation to a workpiece 12 upon which a welding operation is to be performed. The electrode 11 and workpiece 12 comprising, generally, the welding circuit 13, may be connected to a suitable source of welding current such as the generator 14. This generator may be of the constant potential type having an open circuit voltage of from 50 to 80 volts, although the invention is not limited to the use of a source of this particular type as other suitable sources of welding current, including alternating current sources, may be used. No particular electrode feeding or holding means has been shown as it is to be understood that any suitable feeding or holding device may be utilized in practicing the invention.

In order to initiate an arc between the spaced electrode 11 and the workpiece 12 and initiate a welding operation without requiring movement of the electrode 11 to engage the workpiece 12, suitable means may be provided for ionizing the gap between the electrode and the workpiece. For example, an auxiliary initiating circuit denoted generally by the numeral 16 may be provided. The circuit shown comprises, a relatively high voltage transformer 17 energized from a suitable source of alternating current such as the alternator 18, a condenser 19, and a spark gap 20. A relatively high frequency impedance 22 or its equivalent may be utilized to protect the transformer 17 from the high frequency voltage. The initiating circuit 16 may be connected between the electrode 11 and the workpiece 12 utilizing the inductance of the electrode 11, the electrode nozzle, and the leads connecting it thereto, the condenser 19 and the spark gap 20 connected in series circuit relation so as to produce a relatively high frequency voltage between the electrode and the workpiece. The auxiliary condensers 24 may be utilized as bypasses to connect the transformer 17 and the welding circuit 13 to ground, so as to protect the associated equipment against the high frequency voltage produced in the initiating circuit.

For the purpose of insuring rapid establishment of a power arc between the spaced electrode 11 and the workpiece 12 in response to an initiating arc produced by the auxiliary circuit 16, energy storage means may be provided in connection with the relatively low voltage source 14 to effect a substantially instantaneous flow of welding current between the electrode and the workpiece as soon as an initiating arc therebetween is produced. For example, an energy storage condenser 26 may be connected across the welding circuit 13 between the electrode 11 and the source 14. In most instances, a condenser having a capacity of from 50 to 250 microfarads will suffice, as contrasted with the usual .1 to 1 microfarad condenser ordinarily used to bypass the high frequency current. To prevent this storage condenser from substantially short-circuiting the high frequency initiating circuit 16, a high frequency impedance such as the air core reactor 28 may be connected between the storage condenser 26 and the welding electrode to block the flow of high frequency current through the storage condenser 26.

In order to effect rapid termination of a welding operation without requiring movement of the electrode 11 towards or away from the workpiece 12 and without requiring interruptions of the welding circuit by means of switches, contactors or the like, arc extinguishing means denoted generally by the numeral 30 may be provided. In one form thereof the arc extinguishing means may comprise a substantially rectangular magnetic core member 32 which may be substantially symmetrically disposed about the path of the arc current adjacent the arc. In this manner the arc current is prevented from inducing an asymmetric magnetic field in the core which might cause the arc to be deflected during the welding operation.

The core member 32 may, for example, comprise spaced apart leg portions 33 and 34 connected by end members 35 and 36 positioned on opposite sides of the welding electrode. Means such as the projecting pole piece 38 may be provided on each of the end pieces to provide an air gap substantially perpendicular to the arc path, wherein the arc may be positioned. An operating winding 40, which may be energized from any suitable source, either alternating current or direct current, may be positioned on the leg portion 33 for producing a magnetic flux across the air gap between the pole members 38 to extinguish an arc between the electrode and workpiece.

Suitable means may be provided for producing a flux in the leg portions 34 in opposition to the flux produced by the coil 40, such as, for example, a short circuited winding 42 positioned about the leg portion 34 comprising, either a sleeve of copper or a plurality of short circuited turns. The end members 35 and 36 may, if desired, be provided with depressed central portions so that the pole members 38 may be positioned adjacent the arc without having the windings 40 and 42 interfere with the workpiece.

Energization of the initiating circuit 16 and the arc extinguishing means 30 may be effected in any suitable manner. Where the duration of the welding operation is relatively short, energization of the initiating circuit and arc extinguishing means may be effected in predetermined timed relation to each other by switching means such as that denoted, generally, by the numeral 44. The switching means may, for example, comprise relatively movable commutator segments 45 and 46 mounted on a shaft 47 which may be driven by suitable means such as the motor 48. Relatively movable brush members 49, 50 and 51, 52 may be associated with the segments 45 and 46, respectively, for adjusting the duration of the energization of the arc extinguishing means 30 and the arc initiating circuit 16. Control of the driving motor 48 may be effected by suitable switch means 54.

To perform a welding operation the operator may adjust the angular position of the segment 45 relative to the segment 46 to determine the duration of the welding period. The distance between the pairs of brushes 49, 50 and 51, 52 may also be adjusted if it is desired to provide predetermined periods of energization of the arc extinguishing means and the arc initiating circuit. The switch 54 may then be closed to energize the driving motor 48. When the segment 46 is engaged by both of the brushes 51 and 52 the transformer 17 is connected to the source 18. A relatively high voltage is produced across the condenser 19 of the arc initiating circuit, causing the arc gap 20 to break down and produce a relatively high frequency voltage between the electrode 11 and the workpiece 12. The gap between the electrode and the workpiece becomes ionized and the storage condenser 26 in the welding circuit discharges across the gap substantially instantaneously. This discharge sustains a power arc across the gap for a sufficient length of time to permit the welding current supplied to the arc by the relatively low voltage source 14 to build up to a sufficient value to maintain the arc and perform the welding operation.

When the segment 45 engages the brushes 49 and 50, the winding 40 of the arc extinguishing means 30 is thereby connected to the alternating current source 18. An alternating current flux is thereby produced in the core member 32. This flux induces a current in the short circuited winding 42, which current produces a flux in the leg portion 34 of the core member in opposition to the flux produced by the winding 40. As a result, a relatively strong magnetic flux is produced across the air gap between the projecting pole members 38, which is substantially perpendicular to the path of the arc current, and which functions to extinguish the arc by means of the resulting motor action on the arc, and terminate the welding operation.

Referring to Figs. 2 and 3, the reference numeral 56 may denote, generally, a modified form of arc extinguisher. As shown, the magnetic core member may comprise a pair of substantially similar L-shaped members of laminated magnetic material having oppositely positioned end leg portions 57 and 58 whereon suitable windings 59 and 60, respectively, may be positioned and side leg portions 61 and 62 positioned on opposite sides of the welding electrode 11. The side leg portions may, as hereinbefore described in connection with the arc extinguishing means 30 of Fig. 1, be provided with inwardly projecting pole members 63 to provide an air gap 64 substantially perpendicular to the arc path. Suitable means may be provided for adjusting the L-shaped members relative to each other such as, for example, the adjusting screws 65 which are preferably of a non-metallic material such as brass, copper or the like so as not to effect the flux in the air gap 64. Both of the windings 59 and 60 may be connected to a suitable source of alternating or direct current, or one of the windings may be connected to a source of alternating current and the other short circuited as is the winding 42 in the welding system shown in Fig. 1. The side leg portions 61 and 62 may be depressed intermediate their ends to permit the pole members 63 to be positioned adjacent the arc and yet provide clearance for the windings 59 and 60. Variations of the magnetic flux in the air gap 64 may be readily effected by means of the adjusting screws 65 whereby the distance between the pole members 63 may be varied. As shown, arc stabilizing means may be used in connection with the arc extinguishing means 56. For example, a sleeve 66 of magnetic material may be positioned about the electrode 11 and a winding 67 connected in the welding circuit may be used therewith to produce a magnetic field along the axis of the arc. Operation of the arc extinguishing means 56 is in other respects substantially similar to that of the arc extinguishing means 30 described in connection with Fig. 1.

In Figs. 4 and 5 the reference numeral 70 may denote, generally, another modification of arc extinguishing means, which may comprise a substantially rectangular core member 71 having an air gap 72 in one leg thereof wherein the arc to be extinguished may be positioned, and a winding 73 which may be connected to a suitable source of alternating current for producing an arc extinguishing flux in the air gap 72 substantially perpendicular to, or transverse to, the path of the arc current. In order to prevent the arc current from producing a magnetic field across the air gap 72 by induction which would deflect the arc while a welding operation is being performed, suitable means may be provided to compensate for any effect of the welding current on the core member 71. For example, a compensating winding 74 may be positioned on the core member and connected in series circuit relation with the electrode 11 and the workpiece 12 upon which the welding operation is being performed. Means such as the control resistor 76 may be provided for controlling the current through the compensating winding 74 so that it may be adjusted to just offset the induction defect of the arc current on the core member 71.

Referring to Figs. 6 and 7 the reference numeral 78 may denote, generally, still another modification of the arc extinguishing means. This modification may, for example, comprise a substantially toroidal core member 79 which may be concentrically positioned about the electrode 11, and which may be provided with depending pole members 80 positioned on opposite sides of the electrode. Inwardly projecting pole tips 81 may be provided at the ends of the pole members 80 to define an air gap 82 wherein the arc between the electrode 11 and the workpiece 12 may be positioned. Suitable means may be provided for producing a relatively strong magnetic field in the air gap 82 substantially perpendicular to the arc path. In this instance, a winding 84 positioned on one of the pole pieces and connected to a suitable source of alternating or direct current, is utilized.

In Fig. 8 a still further modification of arc extinguishing means is shown. This modification is relatively simple and may be used wherever the electromagnet may be mounted directly underneath the workpiece upon which the welding operation is to be performed. As shown, the electromagnet indicated, generally, by the numeral 86 may comprise a substantially U-shaped magnetic core member 87 having inwardly inclined pole tips 88 which may be positioned adjacent the underside of the workpiece 12. A winding 89 may be positioned on the central portion of the core member to produce a magnetic flux between the pole pieces 88 to deflect the arc between the electrode 11 and the workpiece 12 to extinguish it.

The reference numeral 90 in Fig. 9 may denote, generally, a welding system embodying the invention such as may be used in welding in a submerged arc or relatively deep flux welding process. The welding current may be normally supplied to the welding electrode or nozzle 91 and the workpiece 92 by a relatively low voltage welding transformer 93. A reactor 94 and a suitable switch 95 may be connected in series circuit relation with the transformer and the welding electrode. Movement of the electrode 91 relative to the workpiece 92 to maintain an arc throughout the welding operation may be effected by suitable feed means 96 including a feed motor and feed rolls in a manner well known in the art.

In order to initiate an arc between the electrode 91 and the workpiece 92 through the relatively deep pile of flux 101 generally used in the submerged or deep flux arc welding method, arc initiating means denoted, generally, by the numeral 97 may be provided. The arc initiating means 97 may be substantially similar to the arc initiating means 16 described in connection with the welding system shown in Fig. 1 in that it comprises a relatively high voltage transformer 98 having a condenser 99 connected thereacross and an arc gap 100 connected in series circuit relation between the condenser and the welding electrode 91. The inductance of the leads connecting the initiating means to the welding circuit and of the electrode or nozzle may be utilized in connection with the condenser 99 and the gap 100 to produce the high frequency oscillations. The inductance 28 may be reduced or even omitted if it is desired to protect the feed motor from the high frequency voltage, and the inductance of the electrode or nozzle 91 alone may be used to block the high frequency from the welding circuit. In such case, the inductance of the leads may be reduced if desired by intertwining the leads as shown, or by using concentric leads or other similar means for reducing inductance, so as to produce sufficient high frequency voltage between the electrode and work to initiate the arc.

From the above description and the accompanying drawing it will be apparent that we have provided a welding system wherein the arc may be easily initiated and quickly extinguished without requiring movement of the electrode toward or away from the workpiece upon which the welding operation is to be performed. As a result, the time required to strike a welding arc is greatly reduced, as is also the arc extinguishing time, thus enabling speeding up of the welding operation. The use of a condenser as an energy storage means greatly facilitates the starting of the power arc since it delivers the starting power to the arc path substantially immediately upon ionization by the high frequency spark. Ionization of the arc path is thereby sustained until the welding current from the relatively low voltage source overcomes the electrical inertia or inductance of the welding circuit and builds up to a sufficient value to maintain the arc. By using such an energy storage condenser the length of the arc that may be established is greatly increased. By utilizing the arc extinguishing means disclosed the arc is also easily established without the disadvantage of self-induced deflection thereof during welding operation. As a result of these features a simple and effective welding circuit is provided which is inexpensive and easy to operate. While the arc initiating and arc extinguishing means are described in combination in a welding system, it will be realized that they may also be used independently of each other and the invention is not intended to be limited to their use together or in the particular manner shown and described.

Since certain changes may be made in the above description, and different embodiments of the invention may be made without departing from the spirit thereof, it is intended that all the matter contained in the above description or shown in the accompanying drawing shall be considered as illustrative and not in a limiting sense.

We claim as our invention:

1. An arc welding system comprising, an electrode and work positioned in predetermined spaced relation for maintaining an arc and connected to a relatively low voltage source of welding current, auxiliary high frequency means connected between the electrode and work energizable to initiate a flow of welding current from the source across the space between the electrode and the work, magnetic arc extinguishing means energizable to produce a magnetic field about the arc extinguish the arc between the electrode and work while they remain within arcing distance of each other, and switch means operable to effect energization of the auxiliary high frequency means and arc extinguishing means in predetermined timed relation to each other.

2. An automatic arc welding system for effecting a welding operation on a workpiece comprising, an electrode positioned in spaced relation to the workpiece and connected therewith to a relatively low voltage source of welding current, circuit means energizable to initiate an arc between the spaced electrode and workpiece, control means energizable to produce an electromagnetic field in a direction substantially transverse to the arc, and timing means effecting the energization of the circuit means and said control means in predetermined time relation to each other.

3. The combination with a relatively low voltage arc welding circuit having work and an electrode positioned in spaced relation thereto connected to a direct current generator for supplying electrical energy directly to an arc, of a relatively high frequency initiating circuit associated with the welding circuit to initiate current flow from the direct current generator across the space between the work and electrode without contact of the work and electrode, a condenser of at least 100 microfarad capacity connected across the generator to supply a sufficiently large surge of current to sustain the arc until sufficient current flows from the source to maintain the arc, and an impedance connected between the condenser and the arc to block the flow of current from the high frequency source.

4. Arc extinguishing means for an arc welding circuit having a workpiece and a spaced arc electrode connected to a relatively low voltage source of arc current comprising, means including an electromagnetic core having an air gap transverse to the arc to receive the arc, means including a winding energized in proportion to the arc current associated with the core to neutralize the inductive effect of the arc current on the core so as to prevent distortion of the arc thereby, and means including a normally de-energized control winding connected to produce a magnetic flux in the air gap to extinguish the arc.

5. Arc welding control means for an arc welding circuit having a workpiece and an electrode in substantially fixed spacial relation thereto connected to a relatively low voltage source of welding current for maintaining an arc therebetween comprising, a substantially symmetrical magnetic core member positioned about the arc current path adjacent the arc having relatively movable projecting pole members disposed on opposite sides of the arc to define a variable air gap transverse to and about the arc path, and an operating winding positioned on the core connected to a source of electrical energy to produce a magnetic flux across the arc gap to extinguish the arc.

6. Extinguishing means for an arc welding system having work and a spaced electrode connected to a relatively low voltage source for providing an arc therebetween comprising, a magnetic core positioned substantially symmetrically about the arc current path having projecting pole portions on opposite sides of the arc to define an air gap about the arc and transverse thereto, and means including a winding positioned on the magnetic core connected to a source of electrical energy to produce a magnetic field transverse to the arc path of sufficient strength to extinguish the arc.

7. Arc welding control means for an arc welding circuit having work and a spaced electrode connected to a relatively low voltage source of arc welding current comprising, arc initiating means including a relatively high frequency auxiliary circuit operable to produce an arc initiating voltage between the work and electrode, energy storage means connected to the low voltage source effective to supply welding current upon operation of the arc initiating means until the current from the source reaches a value sufficient to maintain the arc, arc extinguishing means including an electromagnetic device operable to produce a magnetic flux to extinguish the arc, and timing means effecting operation of the arc initiating and arc extinguishing means at predetermined intervals of time to effect a welding operation.

8. Means for extinguishing an arc in an arc welding circuit comprising, a substantially closed magnetic core member positioned transverse to and about the arc path, said core member having opposed pole pieces projecting inwardly intermediate opposite sides of the core member to provide an air gap transverse the arc, an operating winding on the core member to one side of the pole pieces, and an additional winding positioned on the core member to the other side of the pole pieces, said windings being opposed so as to produce an air gap flux to extinguish the arc.

9. An arc welding system comprising, a welding circuit including work and a spaced electrode connected to and arranged to be energized directly from a relatively low voltage source of welding current having a predetermined time characteristic which requires a predetermined time interval for the current to build up to an arc sustaining value after an arc is initiated, an auxiliary arc initiating circuit associated with the welding circuit, and means including a condenser of at least 50 microfarads capacity connected across the source and an inductance device connected between the condenser and the arc cooperative with the condenser to sustain the arc until the expiration of the predetermined time after initiation of the arc when sufficient current flows from the source to maintain said arc.

10. The combination with an arc welding system having an electrode and work positioned in spaced relation and connected to a relatively low voltage source of welding current for maintaining an arc therebetween, of arc extinguishing means comprising an electromagnetic core member having a portion positioned in a plane transverse to and surrounding the path of the arc current and substantially symmetrically disposed thereabout, said core being positioned at a distance from the arc and having projecting legs defining an air gap substantially transverse to the path of the arc substantially at the arc and an operating winding effective to produce a magnetic flux in the air gap to extinguish the arc.

ALFRED B. WHITE.
CHARLES H. JENNINGS.